US012797913B2

(12) United States Patent
Ishii

(10) Patent No.: US 12,797,913 B2
(45) Date of Patent: Nov. 17, 2026

(54) HYDROCARBON RECOVERY DEVICE AND CLEANING SYSTEM

(71) Applicant: ACT FIVE CO., LTD., Kyoto (JP)

(72) Inventor: Ikuo Ishii, Kyoto (JP)

(73) Assignee: ACT FIVE CO., LTD., Kyoto (JP)

( * ) Notice: Subject to any disclaimer, the term of this patent is extended or adjusted under 35 U.S.C. 154(b) by 123 days.

(21) Appl. No.: 18/783,940

(22) Filed: Jul. 25, 2024

(65) Prior Publication Data

US 2026/0027591 A1 Jan. 29, 2026

(51) Int. Cl.
*B08B 3/00* (2006.01)
*B01D 53/04* (2006.01)

(52) U.S. Cl.
CPC ............ *B08B 3/00* (2013.01); *B01D 53/0438* (2013.01); *B01D 2257/702* (2013.01); *B01D 2259/4009* (2013.01); *B08B 2230/01* (2013.01)

(58) Field of Classification Search
CPC ........................................................ B08B 3/00
See application file for complete search history.

(56) References Cited

FOREIGN PATENT DOCUMENTS

| | | |
|---|---|---|
| JP | H03-143520 A | 6/1991 |
| JP | H07-039717 A | 2/1995 |

*Primary Examiner* — Jason Y Ko
(74) *Attorney, Agent, or Firm* — Oliff PLC

(57) ABSTRACT

A device (10) for recovering a hydrocarbon from gas includes: a treatment chamber (11A) arranging a hydrocarbon adsorbent; a gas-introduction valve (12A) for introducing gas into the chamber; a gas-discharge valve (13A) for discharging gas from the chamber; a vacuum pump (19) having an intake port connected to the chamber via a suction valve (14A) and an outlet port connected to a hydrocarbon liquefier (20); and a relief valve (15A) for opening the chamber to ambient gas. A valve controller (211) performs a gas-treating operation in which the gas-introduction and gas-discharge valves are opened while the suction and relief valves are closed, as well as an adsorbent-regenerating operation in which a suction sub-operation for closing the relief valve and opening the suction valve, and an atmospheric relief sub-operation for opening the relief valve and closing the suction valve, are alternately performed multiple times, with the gas-introduction and gas-discharge valves closed.

21 Claims, 6 Drawing Sheets

HYDROCARBON RECOVERY DEVICE AND CLEANING SYSTEM

TECHNICAL FIELD

The present invention relates to a hydrocarbon recovery device for recovering a vaporized hydrocarbon as well as a cleaning system for cleaning a workpiece with a cleaning liquid which contains a hydrocarbon, the system including the aforementioned hydrocarbon recovery device.

BACKGROUND ART

It has been common occurrence to clean workpieces with a cleaning liquid which contains a hydrocarbon. For example, after a workpiece has been cleaned by being immersed in a cleaning liquid held in an immersion cleaning chamber (immersion cleaning), the workpiece is placed within a vacuum container. After the vacuum chamber has been evacuated, the steam of a cleaning liquid (which is normally a cleaning liquid held in a reservoir separate from the immersion cleaning chamber) is introduced into that chamber. The steam liquefies on the surface of the cooler workpiece, whereby the workpiece is further cleaned (steam cleaning). The workpiece can be progressively cleaned by repeating the steam-cleaning operation multiple times. However, the temperature of the workpiece gradually increases due to the heat from the steam, causing the steam-cleaning effect to be lower. To solve this problem, when the temperature of the workpiece has reached or exceeded a specific value, the pressure within the vacuum chamber is rapidly reduced to induce the bumping and vaporization of the cleaning liquid adhered to the surface of the workpiece and thereby dry the workpiece (vacuum drying).

In the steam-cleaning process, a portion of the steam of the cleaning liquid remains in the form of gas, without being liquefied, and is discharged from the vacuum chamber. In the vacuum-drying process, gas resulting from the vaporization of the cleaning liquid adhered to the surface of the workpiece is discharged from the vacuum chamber. These gases contain hydrocarbons. Since hydrocarbons are subject to emission control, it is necessary to recover hydrocarbons contained in the gas discharged from the reservoir and the vacuum chamber.

Patent Literature 1 discloses a hydrocarbon recovery device configured to recover a solvent component from gas which contains a hydrocarbon-solvent component (this gas is hereinafter called the "treatment target gas"). In this device an adsorbent whose principal component is activated carbon is contained in an adsorption tower, and the treatment target gas is sent into this adsorption tower, in which the hydrocarbon contained in the treatment target gas is removed by being adsorbed onto the adsorbent (gas-treating operation). After this operation is continued for a certain period of time, the adsorbent becomes less capable of adsorbing the solvent component. Accordingly, after a predetermined period of time from the beginning of the gas-treating operation, the supply of the treatment target gas into the adsorption tower is discontinued (to thereby discontinue the gas-treating operation), and the pressure within the adsorption tower is reduced to cause the desorption of the hydrocarbon adsorbed on the adsorbent (adsorbent-regenerating operation). Through this adsorbent-regenerating operation, the adsorbent restores its capability to adsorb hydrocarbons. The gas of the hydrocarbon desorbed from the adsorbent is discharged from the adsorption tower and cooled by a cooling condenser, to be ultimately recovered in a liquefied form. The gas-treating operation and the adsorbent-regenerating operation are alternately carried out. Although a portion of the hydrocarbon gas introduced into the cooling condenser may possibly pass through in the form of gas without being liquefied, the gas which has passed through the cooling condenser is once more introduced into the same condenser and will not be discharged to the outside. The device disclosed in Patent Literature 1 has two adsorption towers, between which the adsorption tower for the gas-treating operation and the supply tower for the adsorbent-regenerating operation are alternately switched. This enables the removal and recovery of hydrocarbons from the treatment target gas to be constantly preformed in one of the adsorption towers.

Patent Literature 2 also discloses a hydrocarbon recovery device having the configuration with two adsorption towers as in Patent Literature 1. A difference of the device in Patent Literature 2 exists in that the gas which has passed through the cooling condenser without being liquefied in the adsorbent-regenerating operation in one adsorption tower is not introduced into the same cooling condenser, but into the other adsorption tower in which the gas-treating operation is being performed, in order to prevent the gas from being discharged to the outside.

CITATION LIST

Patent Literature

Patent Literature 1: JP H07-039717 A
Patent Literature 2: JP H03-143520 A

SUMMARY OF INVENTION

Technical Problem

In any of the hydrocarbon recovery devices disclosed in Patent Literatures 1 and 2, a portion of the adsorbed hydrocarbon remains on the adsorbent even after the adsorbent-regenerating operation has been performed. Therefore, the capability to remove hydrocarbons from the treatment target gas gradually decreases with the repetition of the gas-treating operation and the adsorbent-regenerating operation.

Although the description so far has been concerned with the case of removing the hydrocarbon-solvent component contained in the steam of a cleaning liquid used in the cleaning of a workpiece, a similar problem also occurs in the case of removing the hydrocarbon-solvent component from a treatment target gas which is not the steam of a cleaning liquid.

The problem to be solved by the present invention is to provide a hydrocarbon recovery device which can prevent a decrease in the capability to remove hydrocarbons from a treatment target gas which contains hydrocarbons.

Solution to Problem

A hydrocarbon recovery device according to the present invention developed for solving the previously described problem is a device configured to remove a hydrocarbon from a treatment target gas which contains the hydrocarbon and to recover the hydrocarbon, the device including:

a) a treatment chamber having an adsorbent arrangement space in which an adsorbent capable of adsorbing a hydrocarbon is to be arranged;

b) a treatment-target-gas introduction valve which is a valve provided in a treatment-target-gas introduction tube connected to the treatment chamber;

c) a treated-gas discharge valve which is a valve provided in a treated-gas discharge tube connected to the treatment chamber;

d) a vacuum pump having an intake port connected to the treatment chamber by a vacuum suction tube;

e) a hydrocarbon liquefier connected to an outlet port of the vacuum pump;

f) a vacuum suction valve which is a valve provided in the vacuum suction tube;

g) an atmospheric relief valve for allowing the treatment chamber to be open to ambient gas; and h) a valve controller configured to perform a gas-treating operation in which the treatment-target-gas introduction valve and the treated-gas discharge valve are opened while the vacuum suction valve and the atmospheric relief valve are closed, as well as an adsorbent-regenerating operation in which a suction sub-operation for closing the atmospheric relief valve and opening the vacuum suction valve, and an atmospheric relief sub-operation for opening the atmospheric relief valve and closing the vacuum suction valve, are alternately performed a plurality of times, with the treatment-target-gas introduction valve and the treated-gas discharge valve closed.

In the hydrocarbon recovery device according to the present invention, an adsorbent is arranged in the adsorbent arrangement space prior to use. When the gas-treating operation is performed, the treatment-target-gas introduction valve and the treated-gas discharge valve are opened, while the vacuum suction valve and the atmospheric relief valve are closed. This setting causes the treatment target gas to be introduced from the treatment-target-gas introduction tube into the adsorbent arrangement space, and the hydrocarbon contained in the treatment target gas is removed by being adsorbed onto the adsorbent within the adsorbent arrangement space. The treated gas, i.e. the gas resulting from the removal of the hydrocarbon from the treatment target gas, is released through the treated-gas discharge tube to the outside of the hydrocarbon recovery device.

On the other hand, when the adsorbent-regenerating operation is performed, the treatment-target-gas introduction valve and the treated-gas discharge valve are closed. In this state, the suction sub-operation and the atmospheric relief sub-operation are alternately performed a plurality of times. In the suction sub-operation, the pressure within the adsorbent arrangement space is reduced by closing the atmospheric relief valve and opening the vacuum suction valve. This causes the hydrocarbon adsorbed on the adsorbent to be vaporized and desorbed from the adsorbent, and to be ultimately liquefied and recovered in the hydrocarbon liquefier. However, the temperature of the adsorbent gradually decreases with the vaporization of the hydrocarbon due to the vaporization heat; after a certain period of time, a state is reached in which the hydrocarbon remaining on the adsorbent is barely vaporized. Accordingly, after a predetermined period of time from the beginning of the suction sub-operation, the atmospheric relief sub-operation which includes closing the vacuum suction valve and opening the atmospheric relief valve is performed to increase the pressure within the adsorbent arrangement space to atmospheric pressure. Subsequently, the suction sub-operation is resumed by closing the atmospheric relief valve and opening the vacuum suction valve. Consequently, the hydrocarbon once more begins to be desorbed from the adsorbent.

In the hydrocarbon recovery device according to the present invention, the suction sub-operation and the atmospheric relief sub-operation are alternately performed a plurality of times in the adsorbent-regenerating operation, whereby the desorption of hydrocarbons from the adsorbent is promoted. This improves the performance for removing hydrocarbons from the treatment target gas in the gas-treating operation.

Activated carbon grains or activated carbon fibers can be suitably used as the adsorbent.

It is preferable that the hydrocarbon recovery device according to the present invention further include an adsorbent-heating mechanism configured to heat the adsorbent in the adsorbent arrangement space while the valve controller is performing the adsorbent-regenerating operation. This additionally helps the desorption of hydrocarbons from the adsorbent in the adsorbent-regenerating operation.

It is preferable that the hydrocarbon recovery device according to the present invention further include an adsorbent-cooling mechanism configured to cool the adsorbent in the adsorbent arrangement space while the valve controller is performing the gas-treating operation. This additionally helps the removal of the hydrocarbon contained in the treatment target gas in the gas-treating operation. In particular, when the previously described adsorbent-heating mechanism is provided, it is preferable to additionally provide the adsorbent-cooling mechanism since the hydrocarbon-removing efficiency in the subsequent gas-treating operation may be lowered after the adsorbent has been heated in the adsorbent-regenerating operation.

It is preferable that the hydrocarbon recovery device according to the present invention further include an adsorbent-agitating mechanism configured to agitate the adsorbent in the adsorbent arrangement space while the valve controller is performing the adsorbent-regenerating operation. This additionally helps the desorption of hydrocarbons from the adsorbent in the adsorbent-regenerating operation.

In the hydrocarbon recovery device according to the present invention, it is preferable that:

the hydrocarbon recovery device includes two treatment chambers each of which is configured as the previously described treatment chamber;

each of the two treatment chambers is provided with the treatment-target-gas introduction valve, the treated-gas discharge valve, the vacuum suction valve and the atmospheric relief valve; and the valve controller is configured to perform the adsorbent-regenerating operation using the treatment-target-gas introduction valve, the treated-gas discharge valve, the vacuum suction valve and the atmospheric relief valve for one of the two treatment chambers when performing the gas-treating operation using the treatment-target-gas introduction valve, the treated-gas discharge valve, the vacuum suction valve and the atmospheric relief valve for the other treatment chamber, as well as to perform the gas-treating operation using the treatment-target-gas introduction valve, the treated-gas discharge valve, the vacuum suction valve and the atmospheric relief valve for the one of the treatment chambers when performing the adsorbent-regenerating operation using the treatment-target-gas introduction valve, the treated-gas discharge valve, the vacuum suction valve and the atmospheric relief valve for the other treatment chamber. By this configuration, the gas-treating operation is constantly performed in one of the two treatment chambers, so that an operation in which a treatment target gas is generated (e.g., the steam-cleaning and vacuum-drying process which will be described later) can be performed without interruption.

The hydrocarbon recovery device according to the present invention can be suitably used in a cleaning system configured to clean a workpiece with a cleaning liquid which contains a hydrocarbon. A system including the following components can be used as the aforementioned type of cleaning system:

- a vacuum chamber in which a workpiece is to be contained;
- a steam supplier configured to supply, into the vacuum chamber, the steam of a cleaning liquid which contains a hydrocarbon;
- a vacuum pump for a steam-cleaning and vacuum-drying process, having an intake port connected to the vacuum chamber; and
- a hydrocarbon recovery device according to the present invention in which an outlet port of the vacuum pump for a steam-cleaning and vacuum-drying process is directly or indirectly connected to the treatment-target-gas introduction tube.

In this cleaning system, the gas of the cleaning liquid which contains a hydrocarbon component generated in the steam-cleaning and vacuum-drying process is introduced into the hydrocarbon recovery device, whereby the hydrocarbon can be efficiently recovered from that gas by using the adsorbent regenerated in the hydrocarbon recovery device.

In the previously described cleaning system, it is preferable that the same vacuum pump act as both the vacuum pump in the hydrocarbon recovery device and the vacuum pump for the steam-cleaning and vacuum-drying process. The use of one vacuum pump as both the vacuum pump for the steam-cleaning and vacuum-drying process and the vacuum pump in the hydrocarbon recovery device reduces the device cost associated with the vacuum pump.

In the previously described cleaning system, it is preferable that the steam supplier be configured to generate the steam by vaporizing the cleaning liquid which contains a hydrocarbon liquefied in the hydrocarbon liquefier. This configuration allows the cleaning liquid containing a hydrocarbon collected by the hydrocarbon recovery device and liquefied in the hydrocarbon liquefier to be reused for the steam-cleaning process, so that the use of the cleaning liquid will be reduced.

Advantageous Effects of Invention

By the present invention, a decrease in the capability to remove a hydrocarbon from a treatment target gas which contains a hydrocarbon can be prevented in a hydrocarbon recovery device.

DESCRIPTION OF EMBODIMENTS

An embodiment of the hydrocarbon recovery device according to the present invention and an embodiment of a cleaning system including that hydrocarbon recovery device as a component are hereinafter described with reference to FIGS. 1-9.

Figure 1:
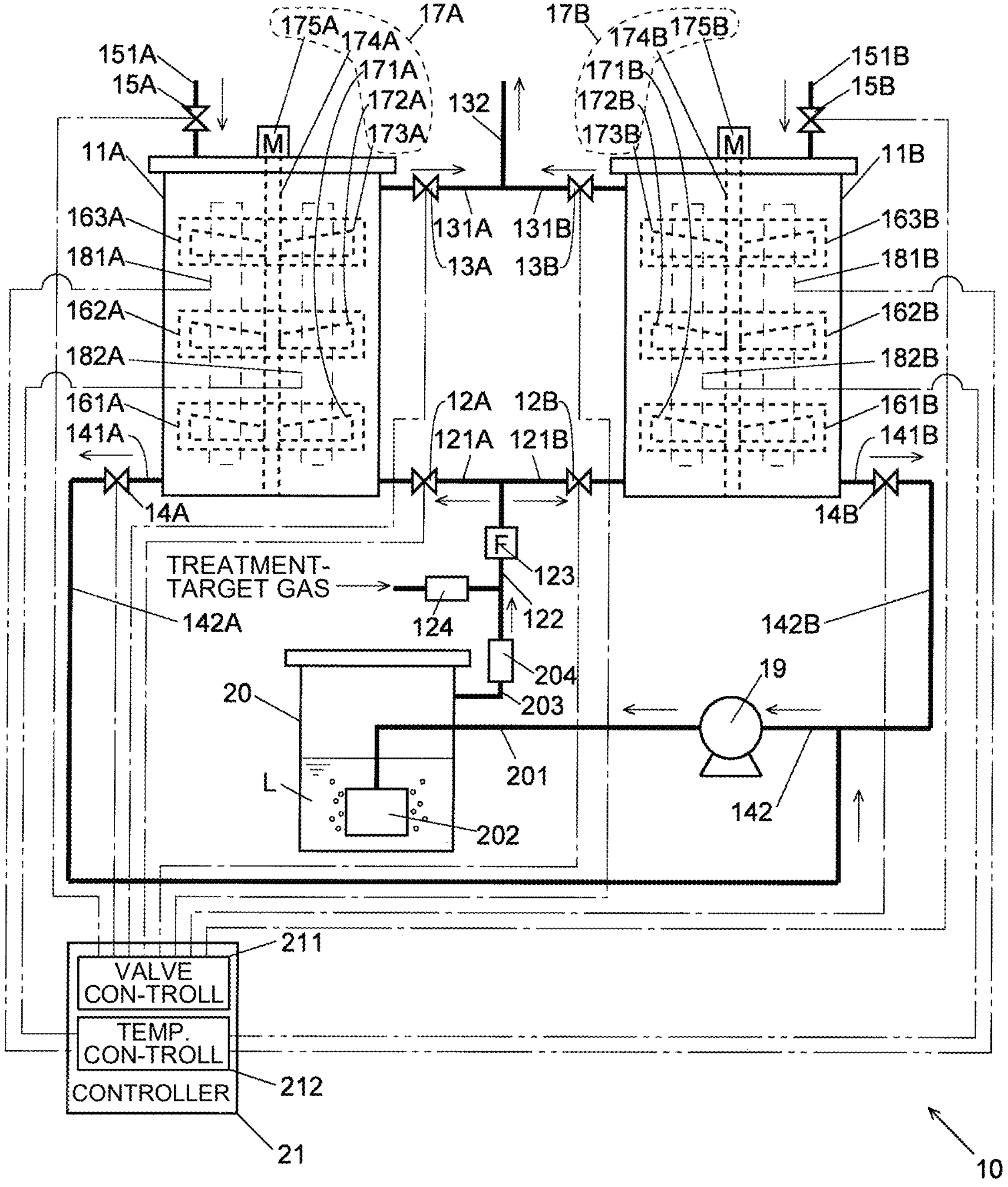
FIG. 1 is a schematic configuration diagram showing one embodiment of the hydrocarbon recovery device according to the present invention.
Figure 2:
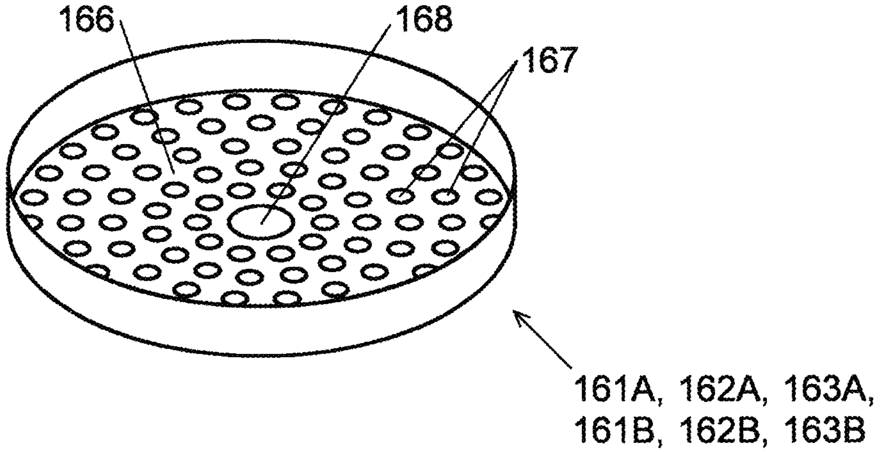
FIG. 2 is a perspective view showing an activated carbon tray of the hydrocarbon recovery device according to the present embodiment.

(1) Configuration of Hydrocarbon Recovery Device According to Present Embodiment FIG. 1 schematically shows the configuration of the hydrocarbon recovery device 10 according to the present embodiment. This hydrocarbon recovery device 10 has two treatment chambers, i.e., a first treatment chamber 11A and a second treatment chamber 11B. The first and second treatment chambers 11A and 11B are identical in configuration. Therefore, the following description takes the first treatment chamber 11A as an example for explaining the detailed configuration; detailed descriptions of the configuration of the second treatment chamber 11B will be omitted. In the following description of the first treatment chamber 11A, the components of the chamber are denoted by reference signs with suffix “A”. Replacing this suffix with “B” gives reference signs which denote the corresponding components of the second treatment chamber 11B. For example, the component in the second treatment chamber 11B which corresponds to the first treatment-target-gas introduction tube 121A (which will be described later) connected to the first treatment chamber 11A is the second treatment-target-gas introduction tube 121B.

A first treatment-target-gas introduction tube 121A is connected to the side surface near the lower end of the first treatment chamber 11A. The first treatment-target-gas introduction tube 121A is provided with a first treatment-target-gas introduction valve 12A. A treatment-target-gas introduction main tube 122 is provided on the upstream side of the first treatment-target-gas introduction tube 121A, and this treatment-target-gas introduction main tube 122 branches into the first and second treatment-target-gas introduction tubes 121A and 121B. The treatment-target-gas introduction main tube 122 is provided with a fan 123 for sending a hydrocarbon gas from the gas source (not shown) toward the first and second treatment chambers 11A and 11B. The same tube 122 is also provided with a flow regulation damper 124 in the downstream area from the fan 123, for regulating (limiting) the flow rate of the gas flowing from the gas source into the treatment-target-gas introduction main tube 122.

A first treated-gas discharge tube 131A is provided on the side surface near the upper end of the first treatment chamber 11A. The first treated-gas discharge tube 131A is provided with a first treated-gas discharge valve 13A. The first and second treated-gas discharge tubes 131A and 131B merge into a treated-gas merging tube 132. The treated gas, i.e., the gas from which hydrocarbons have been removed in the first and second treatment chambers 11A and 11B, is released from the treated-gas merging tube 132 to the outside of the hydrocarbon recovery device 10.

A first vacuum suction tube 141A is provided on the side surface near the lower end of the first treatment chamber 11A. The first vacuum suction tube 141A is provided with a first vacuum suction valve 14A. The first and second vacuum suction tubes 141A and 141B merge into a vacuum suction merging tube 142. The vacuum suction merging tube 142 is connected to the intake port of a vacuum pump 19.

The outlet port of the vacuum pump 19 is connected to a nozzle 202 provided in the hydrocarbon collection chamber 20 through a hydrocarbon collection tube 201. In this hydrocarbon collection chamber 20, a cleaning liquid L is stored to a level higher than the nozzle 202 so that the hydrocarbon gas supplied from the nozzle 202 will be absorbed by the cleaning liquid L. The hydrocarbon collection chamber 20 and the nozzle 202 correspond to the hydrocarbon liquefier described earlier. The hydrocarbon collection chamber 20 has a collection chamber discharge tube 203 connected to its upper portion. The collection chamber discharge tube 203 is connected to the treatment-target-gas introduction main tube 122. A flow regulation damper 204 for regulating (limiting) the flow rate of the gas flowing from the hydrocarbon collection chamber 20 into the treatment-target-gas introduction main tube 122 is provided in the collection chamber discharge tube 203.

The first treatment chamber 11A is provided with a first atmospheric relief tube 151A on its top surface. The first atmospheric relief tube 151A is provided with a first atmospheric relief valve 15A.

Within the first treatment chamber 11A, three activated carbon trays (the first lower activated carbon tray 161A, first middle activated carbon tray 162A, and first upper activated carbon tray 163A) are vertically arranged each of which contains activated carbon grains as the adsorbent (those activated carbon grains are hereinafter simply called the "activated carbon" unless otherwise noted). Each activated carbon tray has gas passage holes 167 formed in its bottom area 166, with each gas passage hole having an appropriate diameter for preventing the grains of the activated carbon from passing through while allowing for the passage of gas. A shaft passage hole 168 for admitting the first or second shaft 174A or 174B (which will be described later) is also provided in the bottom area (see FIGS. 2 and 3).

The first treatment chamber 11A is provided with a first activated carbon agitation unit 17A. The first activated carbon agitation unit 17A corresponds to the adsorbent-agitating mechanism described earlier. It includes a first lower agitating vane 171A, first middle agitating vane 172A and first upper agitating vane 173A which are provided in the first lower activated carbon tray 161A, first middle activated carbon tray 162A and first upper activated carbon tray 163A, respectively. The three agitating vanes are all fixed to the first shaft 174A.

The first shaft 174A is arranged so that it to extends in a substantially vertical direction, passing through the shaft passage hole 168 of each activated carbon tray. The first activated carbon agitation unit 17A further includes a first motor 175A, located on the top surface of the first treatment chamber 11A, for rotating the first shaft 174A.

Figure 3:
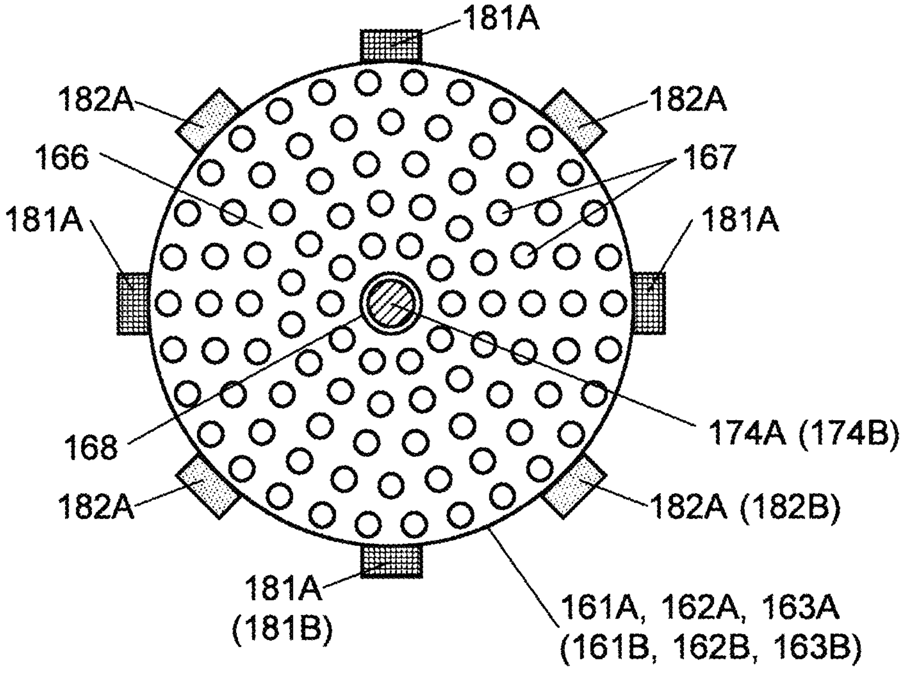
FIG. 3 is a plan view showing a heating jacket and a cooling jacket provided on the circumferential surface of the activated carbon tray in the hydrocarbon recovery device according to the present embodiment.

Each of the first lower, middle and upper activated carbon trays 161A, 162A and 163A has a first heating jacket 181A and a first cooling jacket 182A arranged on its circumferential surface (see FIG. 3). The first heating jacket 181A corresponds to the adsorbent-heating mechanism described earlier. It has a passage for an oil heated to a predetermined temperature (e.g. 130 degrees Celsius) to flow from lower the upper portions. The first cooling jacket 182A corresponds to the adsorbent-cooling mechanism described earlier. It has a passage for the cooling water to flow from the lower to the upper portions.

The hydrocarbon recovery device 10 according to the present embodiment further includes a control unit 21. The control unit 21 has a valve controller 211 and a temperature controller 212 as its functional blocks. The valve controller 211 is configured to control the operation of each of the aforementioned valves, i.e., the first treatment-target-gas introduction valve 12A, second treatment-target-gas introduction valve 12B, first treated-gas discharge valve 13A, second treated-gas discharge valve 13B, first vacuum suction valve 14A, second vacuum suction valve 14B, first atmospheric relief valve 15A and second atmospheric relief valve 15B. The temperature controller 212 is configured to control the temperature of the activated carbon in the first and second treatment chambers 11A and 11B by arranging the timing for supplying the heated oil to the first and second heating jackets 181A and 181B as well as the timing for supplying the cooling water to the first and second cooling jackets 182A and 182B. Details of those control operations will be given later in the description of the operation of the hydrocarbon recovery device 10. The control unit 21 is embodied by a CPU, memory and other hardware components as well as a piece of software for performing the control of those components.

(2) Operation of Hydrocarbon Recovery Device According to Present Embodiment

An operation of the hydrocarbon recovery device 10 according to the present embodiment is hereinafter described. The present device performs a gas-treating process for removing hydrocarbons from a treatment target gas which contains hydrocarbons generated from a gas source (which is typically, but not limited to, a cleaning system 1 which will be described later), as well as an activated carbon regeneration process for regenerating the activated carbon in the activated carbon trays by removing hydrocarbons adhered to the activated carbon due to the gas-treating process. While the gas-treating process is performed in the first treatment chamber 11A, the activated carbon regeneration process is performed in the second treatment chamber 11B. Conversely, while the activated carbon regeneration process is performed in the first treatment chamber 11A, the gas-treating process is performed in the second treatment chamber 11B. Details of those processes will be hereinafter described.

Initially, an operation for performing the gas-treating process in the first treatment chamber 11A and the activated carbon regeneration process in the second treatment chamber 11B is carried out as follows: At the beginning of this operation, the control unit 21 performs an operation as the gas-treating operation for the valves provided in the tubes connected to the first treatment chamber 11A, in which the first treatment-target-gas introduction valve 12A and the first treated-gas discharge valve 13A are opened while the first vacuum suction valve 14A and the first atmospheric relief valve 15A are closed. On the other hand, the control unit 21 also performs an operation as the adsorbent-regenerating operation for the valves provided in the tubes connected to the second treatment chamber 11B, in which the second treatment-target-gas introduction valve 12B and the second treated-gas discharge valve 13B are closed while the second vacuum suction valve 14B and the second atmospheric relief valve 15B are repeatedly opened and closed, as will be described later.

As a result of the open/close operation of the valves, the treatment target gas generated from the gas source is sent into the treatment-target-gas introduction main tube 122 due to the operation of the fan 123 and introduced into an area near the bottom of the first treatment chamber 11A through the first treatment-target-gas introduction tube 121A in which the first treatment-target-gas introduction valve 12A has been opened. Within the first treatment chamber 11A, the treatment target gas gradually moves upward (see FIGS. 4 and 5, in which the thick solid lines represent tubes in which the gas is flowing, while the thick broken lines represent tubes in which there is no flow of gas. It should be noted that, in those drawings, some of the components of the hydrocarbon recovery device 10 are omitted. The same applies to FIGS. 6 and 7, which will be mentioned later). During this process, the treatment target gas within the first treatment chamber 11A sequentially passes through the gas passage holes 167 provided in each of the first lower, middle and upper activated carbon trays 161A, 162A and 163A, with the hydrocarbons contained in the treatment target gas gradually removed by being adsorbed onto the activated carbon C contained in each activated carbon tray. In the present embodiment, since there are multiple (three) activated carbon trays, the hydrocarbons can be more assuredly removed than in the case of a single activated carbon tray.

Meanwhile, under the control of the temperature controller 212, cooling water is supplied through the first cooling jacket 182A, whereby the first lower, middle and upper activated carbon trays 161A, 162A and 163A as well as the activated carbon contained in those trays are cooled. Cooling the activated carbon in this manner helps the adsorption of the hydrocarbon contained in the treatment target gas onto the activated carbon.

Figure 4:
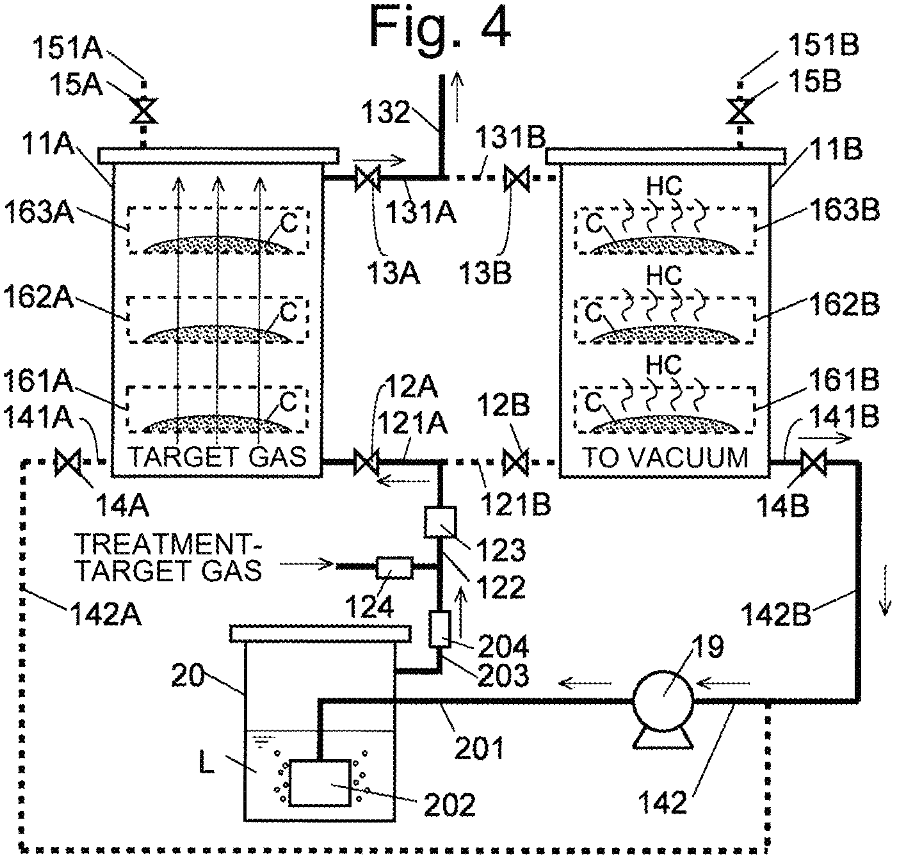
FIG. 4 is a diagram showing a state in which a gas-treating process is performed in the first treatment chamber while a suction sub-process of an adsorbent-regenerating process is performed in the second treatment chamber.
Figure 5:
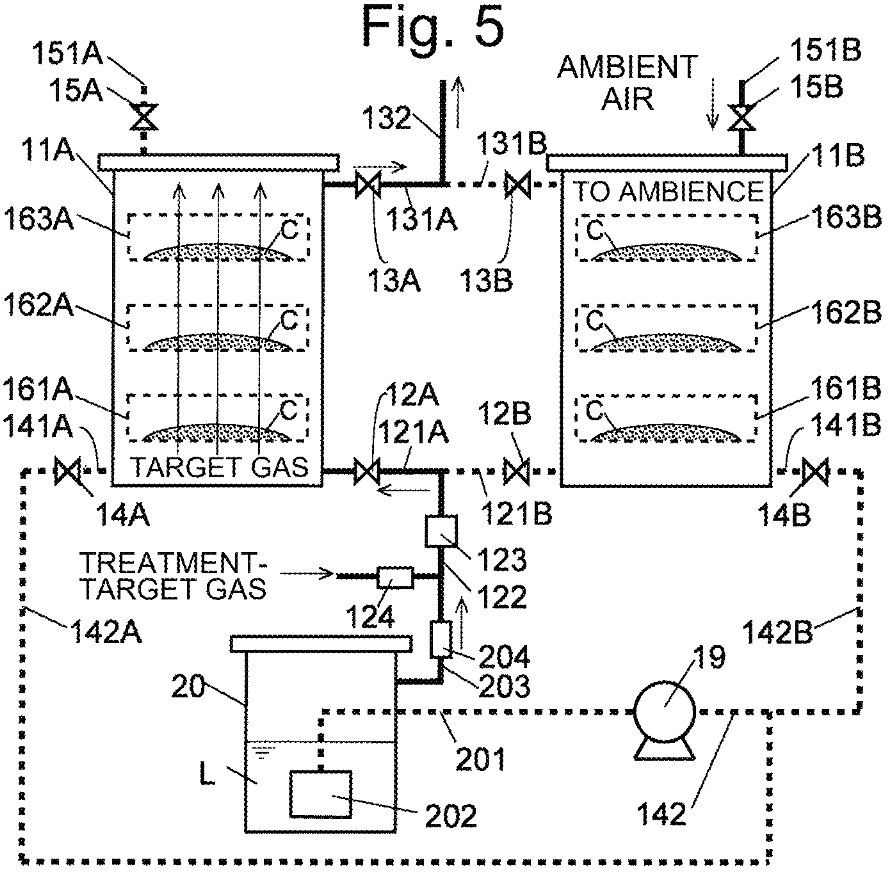
FIG. 5 is a diagram showing a state in which a gas-treating process is performed in the first treatment chamber while an atmospheric relief sub-process of an adsorbent-regenerating process is performed in the second treatment chamber.
Figure 6:
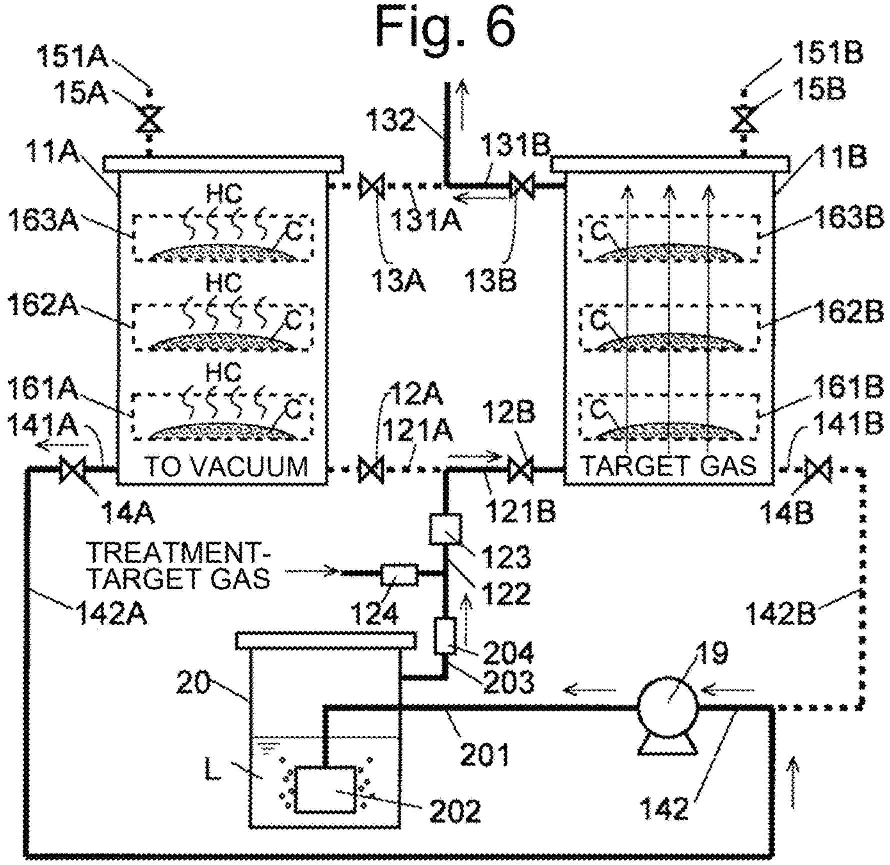
FIG. 6 is a diagram showing a state in which a suction sub-process of an adsorbent-regenerating process is performed in the first treatment chamber while a gas-treating process is performed in the second treatment chamber.
Figure 7:
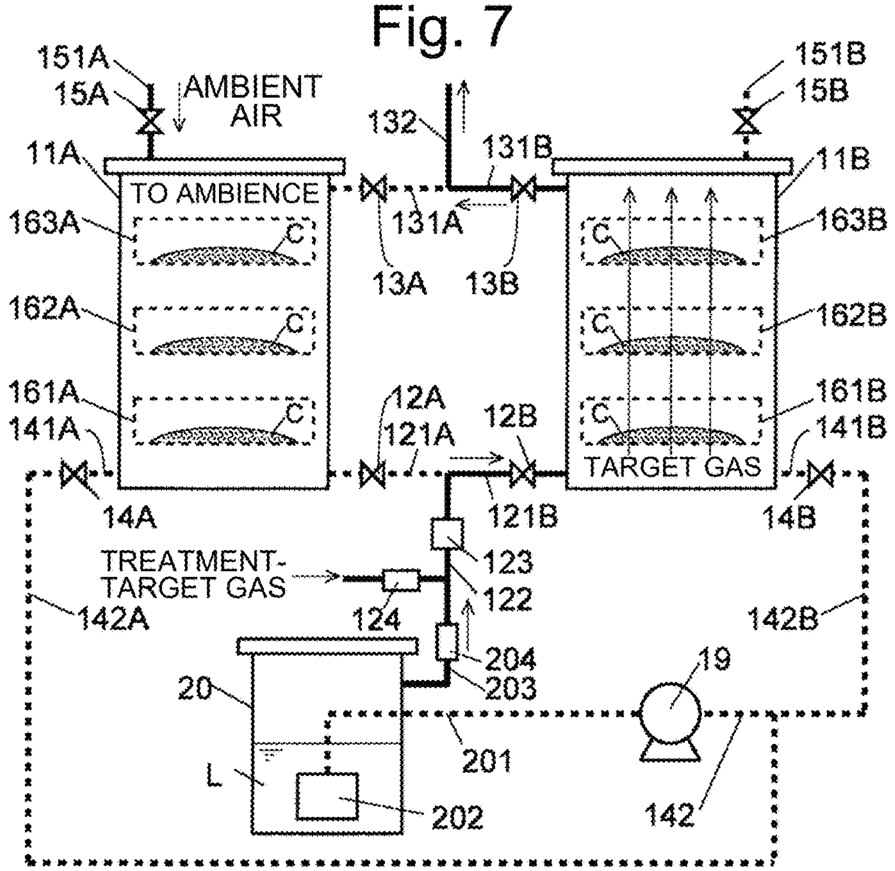
FIG. 7 is a diagram showing a state in which an atmospheric relief sub-process of an adsorbent-regenerating process is performed in the first treatment chamber while a gas-treating process is performed in the second treatment chamber.

The treated gas obtained by removing the hydrocarbon from the treatment target gas in this manner is released into the ambient air through the first treated-gas discharge tube 131A and the treated-gas merging tube 132 (see FIGS. 4 and 5).

While the gas-treating process is performed in the first treatment chamber 11A in this manner, the activated carbon regeneration process for removing the hydrocarbon adhered to the activated carbon contained in the second lower, middle and upper activated carbon trays 161B, 162B and 163B is performed in the second treatment chamber 11B as follows. It should be noted that the activated carbon regeneration process is normally performed on the condition that the gas-treating process was already performed in the second treatment chamber 11B; the process can be omitted if the gas-treating process has not yet been performed since new grains of activated carbon were placed in the trays within the second treatment chamber 11B. However, even when the gas-treating process has not yet been performed, the activated carbon regeneration process may be performed in order to use the activated carbon in a cleaner condition (with no hydrocarbon adhered).

In the activated carbon regeneration process, while the vacuum pump 19 is in operation, the valve controller 211 initially closes the second atmospheric pressure valve 15B and opens the second vacuum suction valve 14B. By this setting, the gas within the second treatment chamber 11B is suctioned by the vacuum pump 19, so that the pressure within the second treatment chamber 11B is reduced. This causes the hydrocarbon (HC) adhered to the activated carbon (C) to be desorbed from the activated carbon (C). The gas of the hydrocarbon flows through the second vacuum suction tube 141B and the hydrocarbon collection tube 201, to be released from the nozzle 202 into the cleaning liquid L in the hydrocarbon collection chamber 20 (suction sub-process; see FIG. 4). Most of the hydrocarbon gas is thereby absorbed into the cleaning liquid L. The portion of the hydrocarbon gas which has not been absorbed into the cleaning liquid L flows through the collection chamber discharge tube 203, treatment-target-gas introduction main tube 122 and first treatment-target-gas introduction tube 121A, to be introduced into the first treatment chamber 11A along with the treatment target gas and adsorbed onto the activated carbon in the activated carbon trays.

During this suction sub-process, the oil heated under the control of the temperature controller 212 is supplied through the second heating jacket 181B, whereby the second lower, middle and upper activated carbon trays 161B, 162B and 163B as well as the activated carbon C contained in those activated carbon trays are heated. This helps the desorption of the hydrocarbon from the activated carbon C. Additionally, the second motor 175B is energized to rotate the second shaft 174B as well as the second lower, middle and upper agitating vanes 171B, 172B and 173B fixed to that shaft, whereby the activated carbon C is agitated to further help the desorption of the hydrocarbon from the activated carbon C.

As the suction sub-process is performed for a certain period of time, the temperature of the activated carbon gradually decreases with the vaporization of the hydrocarbon due to the vaporization heat. Eventually, a state is reached in which the hydrocarbon remaining on the activated carbon is barely vaporized. Accordingly, after a predetermined period of time from the beginning of the suction sub-process, the valve controller 211 performs the operation of closing the second vacuum suction valve 14B and opening the second atmospheric relief valve 15B (atmospheric relief sub-operation) to introduce the ambient air and increase the pressure within the second treatment chamber 11B to the atmospheric pressure (see FIG. 5; atmospheric relief sub-process). The valve controller 211 subsequently the operation of closing the second atmospheric relief valve 15B and opening the second vacuum suction valve 14B. The suction sub-process is thereby resumed, and the hydrocarbon begins to be desorbed from the activated carbon C.

The hydrocarbon recovery device 10 according to the present embodiment alternately performs the suction sub-process and the atmospheric relief sub-process a plurality of times. This helps the desorption of the hydrocarbon from the activated carbon and thereby improves the performance for removing hydrocarbons from the treatment target gas in the subsequent gas-treating process.

After performing the activated carbon regeneration process in the second treatment chamber 11B while performing the gas-treating process in the first treatment chamber 11A in the previously described manner, the valve controller 211 performs control operations for closing the first treatment-target-gas introduction valve 12A, first treated-gas discharge valve 13A, second vacuum suction valve 14B and second atmospheric relief valve 15B, as well as opening the second treatment-target-gas introduction valve 12B and the second treated-gas discharge valve 13B. Furthermore, with regard to the first vacuum suction valve 14A and the first atmospheric relief valve 15A, the valve controller 211 alternately performs the suction sub-operation and the atmospheric relief sub-operation a plurality of times. Thus, the activated carbon regeneration process is performed in the first treatment chamber 11A while the gas-treating process is performed in the second treatment chamber 11B. The operation of the gas-treating process in the second treatment chamber 11B (FIGS. 6 and 7) is similar to the previously described operation performed in the first treatment chamber 11A. The operations of the suction sub-process (FIG. 6) and the atmospheric relief sub-process (FIG. 7) performed for the activated carbon regeneration process in the first treatment chamber 11A are similar to the corresponding operations performed in the second treatment chamber 11B. Accordingly, detailed descriptions of those operations will be omitted.

By performing the gas-treating process and the activated carbon regeneration process in the first and second treatment chambers 11A and 11B with the opposite timings to each other in the previously described manner, the device can regenerate the activated carbon and prevent a decrease in the performance for the removal of the hydrocarbon while constantly performing the gas-treating process for the treatment target gas.

(3) Modified Examples of Hydrocarbon Recovery Device According to Present Invention The hydrocarbon recovery device according to the present invention is not limited to the previous embodiment but allows for various modifications. For example, the activated carbon agitation unit, heating jacket and cooling jacket are not indispensable; some or all of them may be omitted. A heater which electrically generates heat may be used in place of the heating jacket.

In the previous embodiment, three activated carbon trays are provided in each treatment chamber. The number of activated carbon trays may be less than three as well as greater than three. A holding device whose structure is different from the activated carbon tray used in the previous embodiment may be used for holding activated carbon grains, such as a basket-like holder.

Although activated carbon grains were used in the previous embodiment, other types of adsorbents, such as activated carbon fibers, may also be used.

Figure 8:
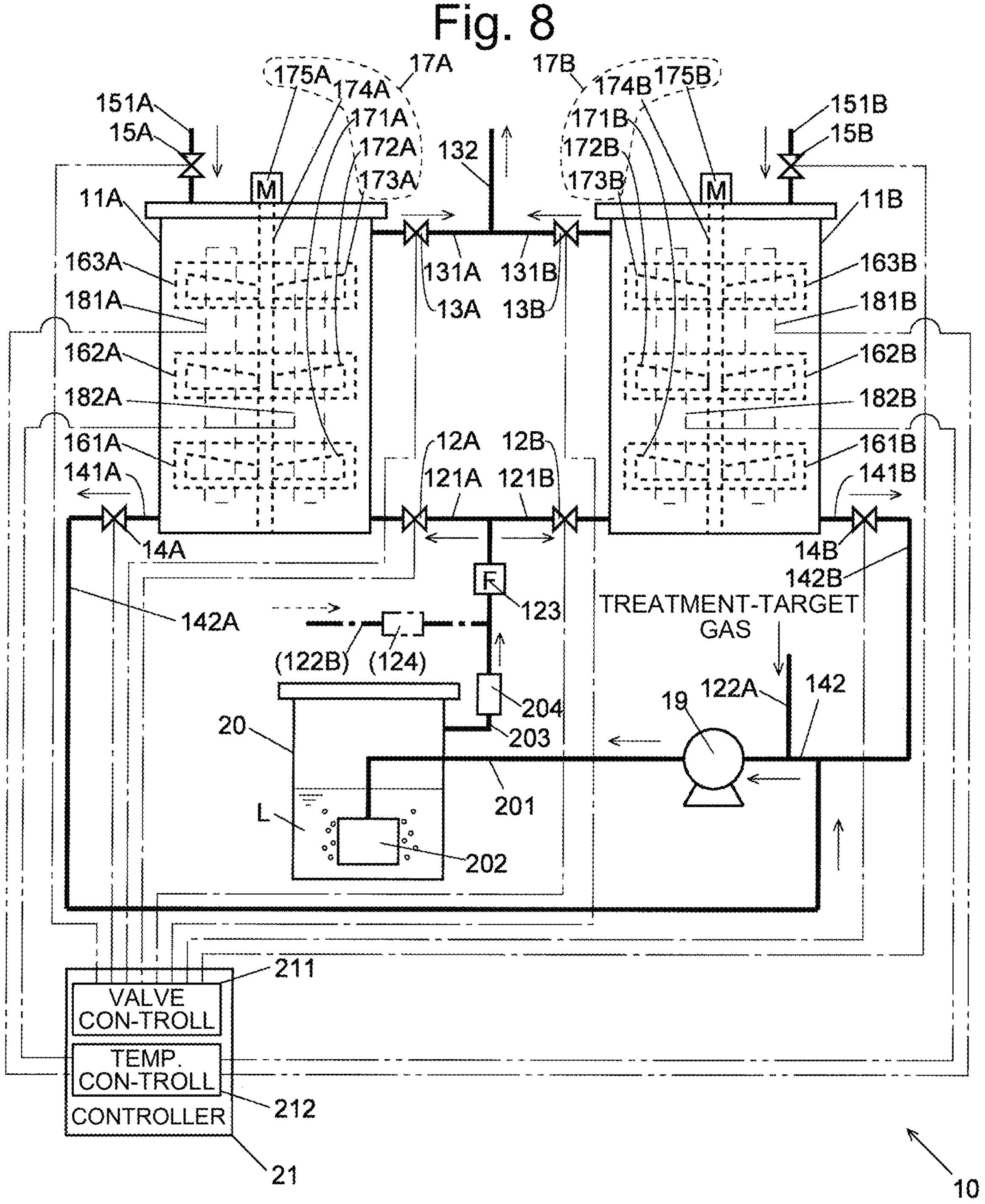
FIG. 8 is a schematic configuration diagram showing a modified example of the hydrocarbon recovery device according to the present embodiment.

In the previous embodiment, the treatment target gas is introduced into the hydrocarbon recovery device 10 from the treatment-target-gas introduction main tube 122 located immediately before the first and second treatment-target-gas introduction tubes 121A and 121B. Another possible configuration is shown in FIG. 8, in which the treatment-target-gas introduction main tube 122A is connected to the intake port of the vacuum pump 19 while the collection chamber discharge tube 203 is directly connected to the first and second treatment-target-gas introduction tubes 121A and 121B. By connecting the treatment-target-gas introduction main tube 122A to the intake port of the vacuum pump 19, the treatment target gas can be introduced into the cleaning liquid L within the hydrocarbon collection chamber 20 before being introduced into the first or second treatment chamber 11A or 11B, whereby a portion of the hydrocarbon contained in the treatment target gas is absorbed into the cleaning liquid L.

Additionally, as indicated by the thick broken lines in FIG. 8, a second treatment-target-gas introduction main tube 122B branching from the collection chamber discharge tube 203 may be provided so that another treatment target gas is introduced from the second treatment-target-gas introduction main tube 122B (apart from the treatment target gas introduced from the treatment-target-gas introduction main tube 122A). In that case, for example, a vacuum chamber for performing a steam-cleaning and vacuum-cleaning process in a cleaning system may be connected to the treatment-target-gas introduction main tube 122A, while ambient gas around the cleaning system may be introduced from the second treatment-target-gas introduction main tube 122B. By this configuration, not only the treatment target gas is introduced from the vacuum chamber into the hydrocarbon recovery device 10, but a hydrocarbon-containing gas which has leaked from the cleaning system can also be introduced from the second treatment-target-gas introduction main tube 122B into the hydrocarbon recovery device 10.

The hydrocarbon recovery device according to the present invention can be suitably used for recovering a hydrocarbon from a gas which contains the hydrocarbon generated from a cleaning liquid containing the hydrocarbon in a cleaning system which will be described later. It should be noted that the hydrocarbon recovery device according to the present invention is not limited to cleaning systems but can also be used for recovering a hydrocarbon from a gas which contains the hydrocarbon generated from a different type of device or container (e.g., a container for storing oil).

Figure 9:
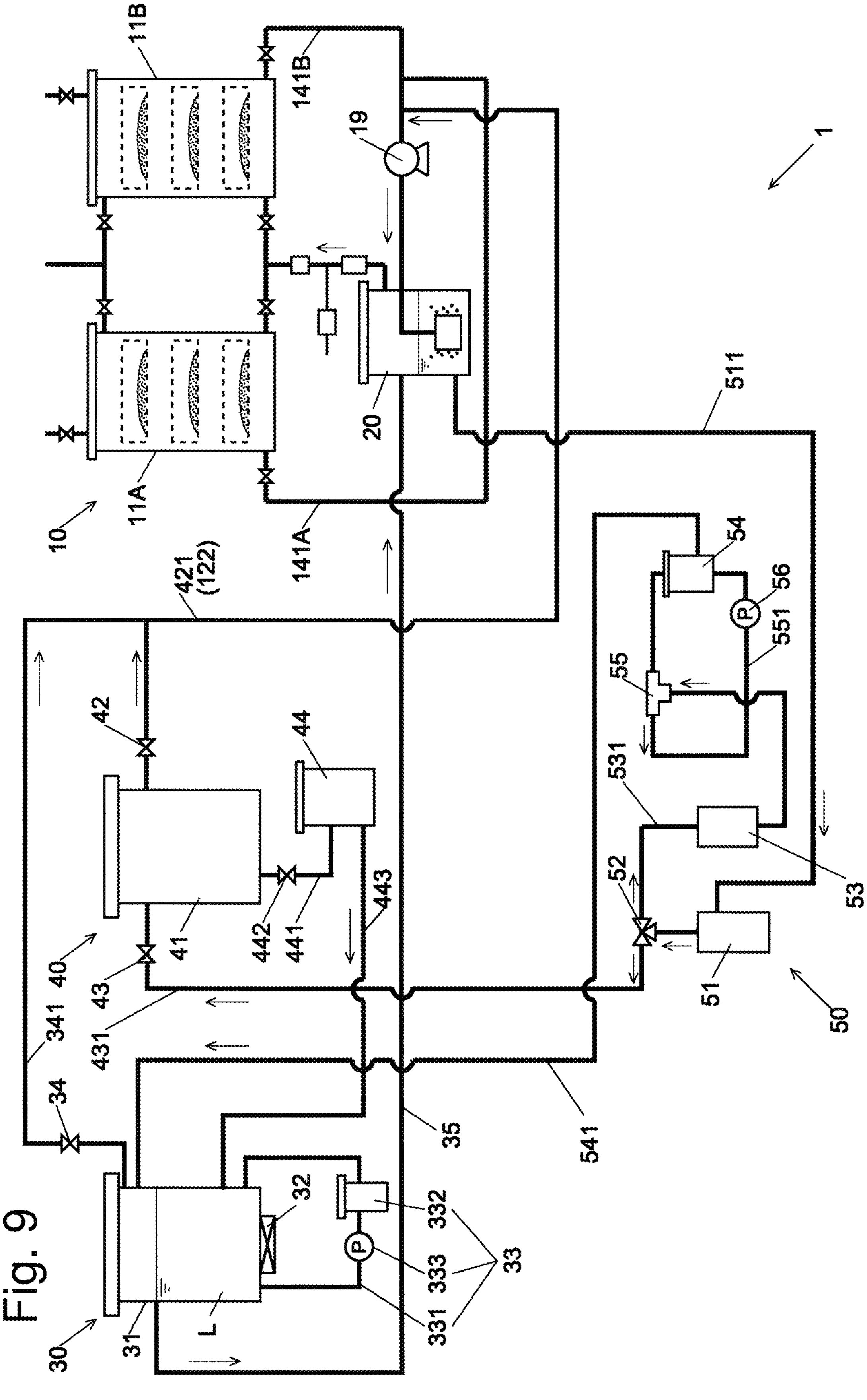
FIG. 9 is a schematic configuration diagram showing a cleaning system having the hydrocarbon recovery device according to the present embodiment as a component.

(4) Cleaning System Having Hydrocarbon Recovery Device According to Present Embodiment FIG. 9 schematically shows the configuration of a cleaning system 1 having the hydrocarbon recovery device 10 according to the present embodiment. This cleaning system 1 includes an immersion cleaning section 30, steam-cleaning and vacuum-drying section 40 as well as a distillation recovery section 50 in addition to the hydrocarbon recovery device 10. The hydrocarbon recovery device 10 used in the example shown in FIG. 9 corresponds to the modified example shown in FIG. 8 equipped with the second treatment-target-gas introduction main tube 122B.

The immersion cleaning section 30 has an immersion cleaning chamber 31 in which a cleaning liquid is to be held, an ultrasonic vibrator 32 for imparting ultrasonic vibration through the cleaning liquid to a workpiece placed in the immersion cleaning chamber 31, and a circulatory filter unit 33 for filtering the cleaning liquid in the immersion cleaning chamber 31. The circulatory filter unit 33 has a circulation tube 331 with both ends connected to the immersion cleaning chamber 31 as well as a filter 332 and a liquid pump 333 provided in the circulation tube 331.

In the immersion cleaning section 30, a workpiece is immersed in the cleaning liquid held in the immersion cleaning chamber 31, and ultrasonic vibration is imparted to this workpiece by the ultrasonic vibrator 32 to clean the workpiece. The impurities dispersed in the cleaning liquid along with the cleaning of the workpiece are removed by the filter 332 in the circulatory filter unit 33.

The immersion cleaning chamber 31 is connected to a distilled-liquid storage tank 54 in the distillation recovery section 50 by a distillation-recovered cleaning-liquid supply tube 541. By this system, the cleaning liquid which contains a hydrocarbon collected in the hydrocarbon collection chamber 20 can be recovered in the distillation recovery section 50 and supplied to the immersion cleaning chamber 31 for reuse. The immersion cleaning chamber 31 is also connected to the hydrocarbon collection chamber 20 in the hydrocarbon recovery device 10 by a return tube 35 at an upper position within the space in which the cleaning liquid is held. When the cleaning liquid in the immersion cleaning chamber 31 exceeds a predetermined level, the cleaning liquid flows through this return tube 35 into the hydrocarbon collection chamber 20. Thus, an overflow of the cleaning liquid from the immersion cleaning chamber 31 is prevented.

The immersion cleaning chamber 31 is connected to the vacuum pump 19 by a deaeration collection tube 341. The deaeration collection tube 341 is provided with a deaeration valve 34. When the deaeration valve 34 is open, the gas vaporized from the cleaning liquid L within the immersion cleaning chamber 31 is suctioned by the vacuum pump 19 and collected in the hydrocarbon recovery device 10.

The steam-cleaning and vacuum-drying section 40 includes a vacuum chamber 41, vacuum on/off valve 42, steam on/off valve 43 and cleaning-liquid collection chamber 44. The vacuum chamber 41 is connected to the vacuum pump 19 by a vacuum-pump connection tube 421. The vacuum-pump connection tube 421 corresponds to the treatment-target-gas introduction main tube 122 in the hydrocarbon recovery device 10 in the example shown in FIG. 8. It is also possible to provide another vacuum pump in the steam-cleaning and vacuum-drying section 40 apart from the vacuum pump 19 provided in the hydrocarbon recovery device 10, with the vacuum chamber 41 connected to the former vacuum pump. In that case, the outlet port of that other vacuum pump should be connected to the treatment-target-gas introduction main tube 122 in the hydrocarbon recovery device 10 in the example shown in FIG. 1. The vacuum on/off valve 42 is provided in the vacuum-pump connection tube 421. The vacuum chamber 41 is also connected to the distillation chamber 51 in the distillation recovery section 50 by a steam supply tube 431. When the steam on/off valve 43 located in the steam supply tube 431 is open, the steam of the cleaning liquid is supplied into the vacuum chamber 41.

The cleaning-liquid collection chamber 44, which is connected to the bottom portion of the vacuum chamber 41 by a cleaning-liquid collection tube 441, is a container for collecting the cleaning liquid liquefied within the vacuum chamber 41. The cleaning-liquid collection tube 441 is provided with a cleaning-liquid collection valve 442. The cleaning-liquid collection chamber 44 is also connected to the immersion cleaning chamber 31 by a cleaning-liquid supply tube 443, so that the cleaning liquid liquefied within the vacuum chamber 41 can be reused in the immersion cleaning section 30.

In the steam-cleaning and vacuum-drying section 40, the steam-cleaning and vacuum-drying process is performed as follows: Initially, after a workpiece has been contained in the vacuum chamber 41, the vacuum on/off valve 42 is opened, whereby the vacuum chamber 41 is evacuated by the vacuum pump 19 and air is removed from the vacuum chamber 41. Subsequently, the vacuum on/off valve 42 is closed, and the steam on/off valve 43 is opened to supply the steam of the cleaning liquid from the distillation chamber 51 into the vacuum chamber 41. After the supply of the steam of the cleaning liquid has been continued for a predetermined period of time, the steam on/off valve 43 is closed, and the vacuum on/off valve 42 is opened to discharge the steam of the cleaning liquid from the vacuum chamber 41 by the vacuum pump 19. The process of supplying and discharging the steam is repeated a plurality of times. Ultimately, vacuum drying is performed by rapidly reducing the pressure within the vacuum chamber 41 by the vacuum pump 19 to induce the bumping of the cleaning liquid adhered to the surface of the workpiece.

The steam of the cleaning liquid discharged from the vacuum chamber 41 during the steam-cleaning and vacuum-drying process is supplied to the hydrocarbon collection chamber 20, and the hydrocarbon contained in the steam is recovered by the hydrocarbon recovery device 10.

The distillation recovery section 50 includes a distillation chamber 51, steam guide valve 52, distiller condenser 53, distilled-liquid storage tank 54, ejector 55 and distilled-liquid circulation pump 56. The distillation chamber 51 is configured to hold the cleaning liquid supplied from the hydrocarbon collection chamber 20 through a distillation-target-liquid supply tube 511 connected to the hydrocarbon collection chamber 20, and to generate steam of the cleaning liquid by heating that liquid by a heater (not shown). The steam guide valve 52 is a three-way valve with which the supply channel of the steam of the cleaning liquid generated in the distillation chamber 51 is switched between the steam supply tube 431 of the steam-cleaning and vacuum-drying section 40 and a distiller-condenser connection tube 531 connected to the distiller condenser 53. The distiller condenser 53 is configured to cool and liquefy the steam of the cleaning liquid supplied from the distillation chamber 51. The distilled-liquid storage tank 54 is a tank for storing the cleaning liquid liquefied in the distiller condenser 53. The distilled-liquid storage tank 54 is connected to the immersion cleaning chamber 31 through the distillation-recovered cleaning-liquid supply tube 541. The ejector 55 is configured to draw the cleaning liquid liquefied in the distiller condenser 53 into the distilled-liquid storage tank 54. It is driven by the circulation of the cleaning liquid in a circulation channel 551 caused by the distilled-liquid circulation pump 56.

In the distillation recovery section 50, the steam of the cleaning liquid is constantly generated by heating, in the distillation chamber 51, the cleaning liquid supplied from the hydrocarbon collection chamber 20. When steam cleaning is performed in the steam-cleaning and vacuum-drying section 40, the channel of the vacuum-guiding valve 52 is set to the steam supply tube 431 so that the generated steam is supplied to the vacuum chamber 41; otherwise, the channel of the vacuum-guiding valve 52 is set to the distiller-condenser connection tube 531 so that the generated steam is supplied to the distiller condenser 53. The steam supplied to the vacuum chamber 41 is used for the steam cleaning. On the other hand, the steam supplied to the distiller condenser 53 is recovered by distillation by being cooled and liquefied. The resulting liquid is collected in the distilled-liquid storage tank 54. The cleaning liquid thus recovered by distillation and collected in the distilled-liquid storage tank 54 is supplied to the immersion cleaning chamber 31 through the distillation-recovered cleaning-liquid supply tube 541.

In the cleaning system according to the present embodiment, the gas vaporized from the cleaning liquid L within the immersion cleaning chamber 31 as well as the steam of the cleaning liquid discharged from the vacuum chamber 41 during the steam-cleaning and vacuum-drying process are introduced into the hydrocarbon recovery device 10, whereby the hydrocarbon contained in the gas and the steam can be recovered without being discharged into the environment. Even when gas which contains a hydrocarbon has leaked from the immersion cleaning chamber 31, vacuum chamber 41 or other locations, the hydrocarbon contained in that gas can be recovered by introducing the gas from the second treatment-target-gas introduction main tube 122B into the hydrocarbon recovery device 10. The recovered hydrocarbon can be absorbed in the cleaning liquid in the hydrocarbon collection chamber 20, and this cleaning liquid can be reused, so that the use of the cleaning liquid will be reduced. Furthermore, since the hydrocarbon recovery device 10 according to the present embodiment is used for the recovery of hydrocarbons, the gradual decrease in the capability to remove hydrocarbons from the steam can be prevented.

In the case where the same vacuum pump 19 is used for both the evacuation performed in the steam-cleaning and vacuum-drying process and the evacuation performed in the regeneration of the adsorbent (activated carbon) in the hydrocarbon recovery device 10, the device cost required for the vacuum pump can be reduced.

The cleaning system using the hydrocarbon recovery device according to the present invention is not limited to the previous embodiment but allows for various modifications as well.

REFERENCE SIGNS LIST

10 . . . Hydrocarbon Recovery Device
11A (11B) . . . First (Second) Treatment Chamber
12A (12B) . . . First (Second) Treatment-Target-Gas Introduction Valve
121A (121B) . . . First (Second) Treatment-Target-Gas Introduction Tube
122 . . . Treatment-Target-Gas Introduction Main Tube
123 . . . Fan
124, 204 . . . Flow Regulation Damper
13A (13B) . . . First (Second) Treated-Gas Discharge Valve
131A (131B) . . . First (Second) Treated-Gas Discharge Tube
132 . . . Treated-Gas Merging Tube
14A (14B) . . . First (Second) Vacuum Suction Valve
141A (141B) . . . First (Second) Vacuum Suction Tube
142 . . . Vacuum Suction Merging Tube
15A (15B) . . . First (Second) Atmospheric Relief Valve
151A (151B) . . . First (Second) Atmospheric Relief Tube
161A (161B) . . . First (Second) Lower Activated Carbon Tray
162A (162B) . . . First (Second) Middle Activated Carbon Tray
163A (163B) . . . First (Second) Upper Activated Carbon Tray
166 . . . Bottom Area of Activated Carbon Tray
167 . . . Gas Passage Hole
168 . . . Shaft Passage Hole
17A (17B) . . . First (Second) Activated Carbon Agitation Unit
171A (171B) . . . First (Second) Lower Agitating Vane
172A (172B) . . . First (Second) Middle Agitating Vane
173A (173B) . . . First (Second) Upper Agitating Vane
174A (174B) . . . First (Second) Shaft
175A (175B) . . . First (Second) Motor
181A (181B) . . . First (Second) Heating Jacket
182A (182B) . . . First (Second) Cooling Jacket
19 . . . Vacuum Pump
20 . . . Hydrocarbon Collection Chamber
201 . . . Hydrocarbon Collection Tube
202 . . . Nozzle
203 . . . Collection Chamber Discharge Tube
21 . . . Control Unit
211 . . . Valve Controller
212 . . . Temperature Controller
30 . . . Immersion Cleaning Section
31 . . . Immersion Cleaning Chamber
32 . . . Ultrasonic Vibrator
33 . . . Circulatory Filter Unit
331 . . . Circulation Tube
332 . . . Filter
333 . . . Liquid Pump
34 . . . Deaeration Valve
341 . . . Deaeration Collection Tube
35 . . . Return Tube
40 . . . Steam-Cleaning and Vacuum-Drying Section
41 . . . Vacuum Chamber
42 . . . Vacuum On/Off Valve
421 . . . Vacuum Pump Connection Tube
43 . . . Steam On/Off Valve
431 . . . Steam Supply Tube
44 . . . Cleaning-Liquid Collection Chamber
441 . . . Cleaning-Liquid Collection Tube
442 . . . Cleaning-Liquid Collection Valve
443 . . . Cleaning-Liquid Supply Tube
50 . . . Distillation Recovery Section
51 . . . Distillation Chamber
511 . . . Distillation-Target-Liquid Supply Tube
52 . . . Steam Guide Valve
53 . . . Distiller Condenser
531 . . . Distiller-Condenser Connection Tube
54 . . . Distilled-Liquid Storage Tank
541 . . . Distillation-Recovered Cleaning-Liquid Supply Tube
55 . . . Ejector
551 . . . Circulation Channel
56 . . . Distilled-Liquid Circulation Pump
C . . . Activated Carbon
L . . . Cleaning Liquid

The invention claimed is:

1. A hydrocarbon recovery device configured to remove a hydrocarbon from a treatment target gas which contains the hydrocarbon and to recover the hydrocarbon, the device comprising:

a) a treatment chamber having an adsorbent arrangement space configured to arrange an adsorbent capable of adsorbing a hydrocarbon;

b) a treatment-target-gas introduction valve which is a valve provided in a treatment-target-gas introduction tube connected to the treatment chamber;

c) a treated-gas discharge valve which is a valve provided in a treated-gas discharge tube connected to the treatment chamber;

d) a vacuum pump having an intake port connected to the treatment chamber by a vacuum suction tube;

e) a hydrocarbon liquefier connected to an outlet port of the vacuum pump;

f) a vacuum suction valve which is a valve provided in the vacuum suction tube;

g) an atmospheric relief valve for allowing the treatment chamber to be open to ambient gas; and h) a valve controller configured to perform a gas-treating operation in which the treatment-target-gas introduction valve and the treated-gas discharge valve are opened while the vacuum suction valve and the atmospheric relief valve are closed, as well as an adsorbent-regenerating operation in which a suction sub-operation for closing the atmospheric relief valve and opening the vacuum suction valve, and an atmospheric relief sub-operation for opening the atmospheric relief valve and closing the vacuum suction valve, are alternately performed a plurality of times, with the treatment-target-gas introduction valve and the treated-gas discharge valve closed.

2. The hydrocarbon recovery device according to claim 1, further comprising an adsorbent-heating mechanism configured to heat the adsorbent arranged in the adsorbent arrangement space while the valve controller is performing the adsorbent-regenerating operation.

3. The hydrocarbon recovery device according to claim 1, further comprising an adsorbent-cooling mechanism configured to cool the adsorbent arranged in the adsorbent arrangement space while the valve controller is performing the gas-treating operation.

4. The hydrocarbon recovery device according to claim 1, further comprising an adsorbent-agitating mechanism configured to agitate the adsorbent arranged in the adsorbent arrangement space while the valve controller is performing the adsorbent-regenerating operation.

5. The hydrocarbon recovery device according to claim 1, wherein:

the hydrocarbon recovery device includes two treatment chambers each of which is configured as the treatment chamber;

each of the two treatment chambers is provided with the treatment-target-gas introduction valve, the treated-gas discharge valve, the vacuum suction valve and the atmospheric relief valve; and the valve controller is configured to perform the adsorbent-regenerating operation using the treatment-target-gas introduction valve, the treated-gas discharge valve, the vacuum suction valve and the atmospheric relief valve for one of the two treatment chambers when performing the gas-treating operation using the treatment-target-gas introduction valve, the treated-gas discharge valve, the vacuum suction valve and the atmospheric relief valve for another treatment chamber, as well as to perform the gas-treating operation using the treatment-target-gas introduction valve, the treated-gas discharge valve, the vacuum suction valve and the atmospheric relief valve for the one of the treatment chambers when performing the adsorbent-regenerating operation using the treatment-target-gas introduction valve, the treated-gas discharge valve, the vacuum suction valve and the atmospheric relief valve for the another treatment chamber.

6. A cleaning system, comprising:

a vacuum chamber configured to contain a workpiece;

a steam supplier configured to supply, into the vacuum chamber, steam of a cleaning liquid which contains a hydrocarbon;

a vacuum pump for a steam-cleaning and vacuum-drying process, having an intake port connected to the vacuum chamber; and a hydrocarbon recovery device according to claim 1 in which an outlet port of the vacuum pump for a steam-cleaning and vacuum-drying process is directly or indirectly connected to the treatment-target-gas introduction tube.

7. The cleaning system according to claim 6, wherein a same vacuum pump acts as both the vacuum pump in the hydrocarbon recovery device and the vacuum pump for a steam-cleaning and vacuum-drying process.

8. The cleaning system according to claim 6, wherein the steam supplier is configured to generate the steam by vaporizing the cleaning liquid which contains a hydrocarbon liquefied in the hydrocarbon liquefier.

9. A cleaning system, comprising:

a vacuum chamber configured to contain a workpiece;

a steam supplier configured to supply, into the vacuum chamber, steam of a cleaning liquid which contains a hydrocarbon;

a vacuum pump for a steam-cleaning and vacuum-drying process, having an intake port connected to the vacuum chamber; and a hydrocarbon recovery device according to claim 2 in which an outlet port of the vacuum pump for a steam-cleaning and vacuum-drying process is directly or indirectly connected to the treatment-target-gas introduction tube.

10. The cleaning system according to claim 9, wherein a same vacuum pump acts as both the vacuum pump in the hydrocarbon recovery device and the vacuum pump for a steam-cleaning and vacuum-drying process.

11. The cleaning system according to claim 9, wherein the steam supplier is configured to generate the steam by vaporizing the cleaning liquid which contains a hydrocarbon liquefied in the hydrocarbon liquefier.

12. A cleaning system, comprising:

a vacuum chamber configured to contain a workpiece;

a steam supplier configured to supply, into the vacuum chamber, steam of a cleaning liquid which contains a hydrocarbon;

a vacuum pump for a steam-cleaning and vacuum-drying process, having an intake port connected to the vacuum chamber; and a hydrocarbon recovery device according to claim 3 in which an outlet port of the vacuum pump for a steam-cleaning and vacuum-drying process is directly or indirectly connected to the treatment-target-gas introduction tube.

13. The cleaning system according to claim 12, wherein a same vacuum pump acts as both the vacuum pump in the hydrocarbon recovery device and the vacuum pump for a steam-cleaning and vacuum-drying process.

14. The cleaning system according to claim 12, wherein the steam supplier is configured to generate the steam by vaporizing the cleaning liquid which contains a hydrocarbon liquefied in the hydrocarbon liquefier.

15. A cleaning system, comprising:

a vacuum chamber configured to contain a workpiece;

a steam supplier configured to supply, into the vacuum chamber, steam of a cleaning liquid which contains a hydrocarbon;

a vacuum pump for a steam-cleaning and vacuum-drying process, having an intake port connected to the vacuum chamber; and a hydrocarbon recovery device according to claim 4 in which an outlet port of the vacuum pump for a steam-cleaning and vacuum-drying process is directly or indirectly connected to the treatment-target-gas introduction tube.

16. The cleaning system according to claim 15, wherein a same vacuum pump acts as both the vacuum pump in the hydrocarbon recovery device and the vacuum pump for a steam-cleaning and vacuum-drying process.

17. The cleaning system according to claim 15, wherein the steam supplier is configured to generate the steam by vaporizing the cleaning liquid which contains a hydrocarbon liquefied in the hydrocarbon liquefier.

18. A cleaning system, comprising:

a vacuum chamber configured to contain a workpiece;

a steam supplier configured to supply, into the vacuum chamber, steam of a cleaning liquid which contains a hydrocarbon;

a vacuum pump for a steam-cleaning and vacuum-drying process, having an intake port connected to the vacuum chamber; and a hydrocarbon recovery device according to claim 5 in which an outlet port of the vacuum pump for a steam-cleaning and vacuum-drying process is directly or indirectly connected to the treatment-target-gas introduction tube.

19. The cleaning system according to claim 18, wherein a same vacuum pump acts as both the vacuum pump in the hydrocarbon recovery device and the vacuum pump for a steam-cleaning and vacuum-drying process.

20. The cleaning system according to claim 18, wherein the steam supplier is configured to generate the steam by vaporizing the cleaning liquid which contains a hydrocarbon liquefied in the hydrocarbon liquefier.

21. The hydrocarbon recovery device according to claim 1, further comprising the adsorbent arranged in the adsorbent arrangement space.

* * * * *